(12) United States Patent
Harvey et al.

(10) Patent No.: US 10,131,290 B2
(45) Date of Patent: Nov. 20, 2018

(54) REMOVABLE AND SERVICEABLE TWIST LOCK ASSEMBLY CLIP FOR BLIND INSTALLATION

(71) Applicant: Toyota Motor Engineering & Manufacturing North America, Inc., Erlanger, KY (US)

(72) Inventors: Andrew W. Harvey, Ypsilanti, MI (US); Philip J. Babian, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 30 days.

(21) Appl. No.: 15/422,022

(22) Filed: Feb. 1, 2017

(65) Prior Publication Data
US 2018/0208127 A1 Jul. 26, 2018

Related U.S. Application Data

(60) Provisional application No. 62/450,768, filed on Jan. 26, 2017.

(51) Int. Cl.
*B60R 7/06* (2006.01)
*B60R 11/00* (2006.01)
*F16B 5/06* (2006.01)

(52) U.S. Cl.
CPC ............ *B60R 11/00* (2013.01); *F16B 5/0621* (2013.01); *B60R 2011/0005* (2013.01); *B60R 2011/0047* (2013.01); *F16B 2005/0671* (2013.01)

(58) Field of Classification Search
CPC ... E04B 2/7425; G02B 6/4292; H01R 13/113; H01R 2103/00; A61M 16/06;
(Continued)

(56) References Cited

U.S. PATENT DOCUMENTS 4,989,911 A * 2/1991 Van Order ............. B60J 3/0217
248/27.3
5,032,690 A * 7/1991 Bloom ..................... H02G 3/22
174/487

(Continued)

FOREIGN PATENT DOCUMENTS

DE 102012020863 A1 4/2014

*Primary Examiner* — Kiran B Patel
(74) *Attorney, Agent, or Firm* — Dinsmore & Shohl LLP (57) ABSTRACT

A vehicular assembly and a method of connecting a panel to a vehicular structure in order to form an assembly. The assembly includes a clip that is used to join first and second components each of which defines an aperture therein. The first and second components are sized and shaped such that upon being joined to one another, their respective apertures are substantially aligned with one another and held together by the clip. The clip includes a first connector portion and a second connector portion. The clip can be turned in a twisting or screwing motion about an axis of rotation such that upon insertion of the clip into the aperture of the first component and subsequent rotation, the first connector portion forms a locking engagement with an edge structure that is defined by the aperture of the first component. In addition, upon additional insertion of the clip into the aperture of the second component, the second connector portion of the clip forms a resiliently-biased engagement with an edge structure that is defined by the aperture of the second component. This helps promote the blind installation of automotive components in a more ergonomic manner.

9 Claims, 6 Drawing Sheets

(58) Field of Classification Search
CPC ........ H01L 2924/0002; H01L 2924/00; H04B 1/082; H05K 9/0047; Y10T 29/49002
USPC .................................................... 296/37.12
See application file for complete search history.

(56) References Cited

U.S. PATENT DOCUMENTS

| | | | | |
|---|---|---|---|---|
| 5,056,853 A * | 10/1991 | Van Order | ............ | B60J 3/0217 248/27.3 |
| 5,752,853 A * | 5/1998 | Curtindale | ............ | B60J 3/0217 248/222.12 |
| 5,850,676 A * | 12/1998 | Takahashi | ........... | B60R 13/0206 24/297 |
| 6,003,928 A * | 12/1999 | Curtindale | ............ | B60N 3/026 296/214 |
| 6,007,136 A * | 12/1999 | Zittwitz | ................ | B60J 3/0221 24/295 |
| 6,105,844 A | 8/2000 | Walters et al. | | |
| 6,250,708 B1 * | 6/2001 | Kurachi | ................ | B60J 3/0221 296/97.9 |
| 6,481,682 B2 | 11/2002 | Miura | | |
| 7,293,824 B2 * | 11/2007 | Dobson | ................ | B60J 3/0217 296/214 |
| 7,762,829 B2 * | 7/2010 | Daily | ....................... | F21K 9/00 362/294 |
| 7,955,104 B1 * | 6/2011 | Wicks | ................ | H01R 13/7032 439/188 |
| 8,016,530 B2 | 9/2011 | Johnson et al. | | |
| 8,221,041 B2 * | 7/2012 | Hauser | ..................... | F16B 5/10 411/349 |
| 8,235,738 B2 | 8/2012 | Li et al. | | |
| 8,662,807 B2 * | 3/2014 | Adachi | ............... | F16B 19/1081 411/45 |
| 8,793,845 B2 * | 8/2014 | Benedetti | ................ | F16B 5/065 24/292 |
| 8,845,003 B2 * | 9/2014 | Still | ....................... | B60J 3/0213 296/97.9 |
| 8,898,866 B2 * | 12/2014 | Asai | ..................... | F16B 21/086 24/292 |
| 9,080,588 B2 | 7/2015 | Diez Herrera et al. | | |
| 9,266,477 B2 * | 2/2016 | Huelke | .................... | B60N 3/02 |
| 9,649,993 B1 * | 5/2017 | Dickinson | ........... | B60R 13/0206 |
| 9,695,850 B2 * | 7/2017 | Hirakawa | ................ | F16B 2/20 |
| 10,006,479 B2 * | 6/2018 | Dickinson | ............ | F16B 21/076 |
| 2006/0000064 A1 * | 1/2006 | Leverger | ............... | F16B 5/0628 24/297 |
| 2006/0099051 A1 * | 5/2006 | Moerke | ................ | F16B 19/008 411/508 |
| 2007/0001452 A1 * | 1/2007 | Friel | ....................... | F16B 21/02 285/319 |
| 2008/0289155 A1 * | 11/2008 | Kim | ..................... | B60J 3/0213 24/295 |
| 2010/0025547 A1 * | 2/2010 | Smutny | ............... | B60R 16/0215 248/27.3 |
| 2011/0072625 A1 * | 3/2011 | Hemingway | ....... | F16B 37/0842 24/457 |
| 2012/0317757 A1 * | 12/2012 | Risdale | ............... | B29C 45/1635 24/458 |
| 2016/0108950 A1 | 4/2016 | Steffenfauseweh et al. | | |
| 2016/0138629 A1 * | 5/2016 | Flynn | .................. | F16B 19/1081 411/57.1 |
| 2017/0343178 A1 * | 11/2017 | Asghari | .................. | F21S 41/19 |

\* cited by examiner

FIG. 6

REMOVABLE AND SERVICEABLE TWIST LOCK ASSEMBLY CLIP FOR BLIND INSTALLATION

CROSS-REFERENCE TO RELATED APPLICATIONS

This application claims benefit to U.S. Provisional Application Ser. No. 62/450,768 filed Jan. 26, 2017.

TECHNICAL FIELD

The present specification relates generally to a devices and methods for attaching vehicular components, and more particularly to a removable and serviceable attachment clip with improved ergonomic features to facilitate ease of attachment of vehicular panels to one another.

BACKGROUND

Automotive manufacturers often use fasteners (also referred to herein as clips) to join various components to one another. Known fasteners are particularly prevalent as a way to join relatively non-loadbearing components such as door trim panels, trim boards, scuff plates, rocker panels, garnish trim or the like without having to resort to the use of nails, screws, rivets or adhesives. In one common form, the portion of such a fastener that is inserted into an aperture of the components to be joined employs a biased, tapered configuration an example of which is recognizable for its so-called Christmas tree shape that can be snap-fit into place. Unfortunately, such fasteners tend to exhibit high insertion force and poor installation ergonomics. This in turn makes them difficult to use during certain vehicular assembly procedures, such as under so-called blind installation conditions where personnel performing the assembly operation cannot visually acquire the mounting location for the fasteners. In such circumstances, the person installing the components is reduced to having to rely upon tactile response in order to ensure that the components being joined are properly aligned and fastened to one another. Furthermore, such fasteners are not serviceable and are difficult to remove, often requiring a special removal tool or permanent damage to the fastener or one or both of the components being joined.

One form of vehicular assembly that often requires such blind installation is the instrument panel (also referred to herein as an instrument panel module) that is located in front of the driver and front passenger seats. In one common form, the instrument panel module extends the substantial lateral dimension of the passenger compartment, as well as a T-shaped fit with a longitudinally-oriented center console. In addition to defining various gauges, displays (such as multi-information displays (MID)) and related indicators that are arranged to provide information to the driver on the operational status of the vehicle and it various systems, the instrument panel module houses various other components, including an infotainment system, a heating, ventilating and air conditioning (HVAC) system and its related controllers, a glove box, airbags or the like.

Because of the precise way the instrument panel module and the center console fit within the passenger compartment during vehicle assembly, installation is a complex process. For example, during conventional vehicle assembly, the instrument panel module is first grasped on a primary structural surface along its underside by a hoist or related robotic mechanism and then inserted into the passenger compartment. Because the instrument panel module tends to be both bulky and heavy (due in part to the presence of the already-attached HVAC blower motor and ducts, radio or related infotainment system, meter/display cluster and wiring harnesses), such insertion is done prior to the inclusion of the glove box, trim, knee airbags, lower panels, undercovers or other relatively non-loadbearing components that may otherwise become damaged during such instrument panel module grasping and insertion. After that, the instrument panel module is then secured to an engine bay firewall or related body component. Subsequently, the various components that form or otherwise interact (such as the center console) with the outer surface of the instrument panel are secured; such components may include trim pieces, registers or the like. In particular, the driver- and passenger-side undercovers tend to be installed last (or very close to it) because once installed, they prevent any accessibility to the components that are situated behind the surface of the installed instrument panel. Because of the limited amount of space present in the passenger compartment in general and the front footwell in particular, an installer on the vehicular assembly line is often situated in an awkward position when attempting to attach these undercovers, as well as other liners, fascia or related components that are used to provide a measure of physical and aesthetic isolation between the passenger compartment and the mechanical, electrical and structural components that are situated within or behind the instrument panel. By being in such a position, the installer is forced to blindly align the apertures and fasten the liners, covers, fairings, fascia or related components. In addition to slowing down the vehicle assembly process by making the proper alignment of the components to be joined more cumbersome, such blind installation can lead to inaccurate placement and fastening, which in turn may adversely impact the fit and finish of the assembled vehicular components.

SUMMARY

In one embodiment, a vehicular assembly is disclosed. The assembly includes a clip that is used to join first and second components each of which defines an aperture therein. The first and second components are sized and shaped such that upon being joined to one another, their respective apertures are substantially aligned with one another and held together by the clip. The clip includes a first connector portion and a second connector portion, as well as defines an axis of rotation about its aperture-insertion (i.e., axial) dimension such that upon insertion of the clip into the aperture of the first component and subsequent rotation about the axis of rotation, the first connector portion forms a locking engagement with an edge structure that is defined by the aperture of the first component. In addition, upon subsequent insertion of the clip into the aperture of the second component, the second connector portion of the clip forms a resiliently-biased engagement with an edge structure that is defined by the aperture of the second component.

In another embodiment, a vehicular assembly is disclosed. The assembly includes a cover defining an aperture therein that possesses a non-axisymmetric shape about its periphery. In addition, the assembly includes a clip cooperatively engaged with the aperture. The clip—which defines an axis of rotation about an aperture-insertion dimension—includes a first connector portion and a second connector portion. The cooperation of the clip and the cover is such that upon insertion of the clip into the aperture and subsequent rotation about the axis of rotation, flanges formed in the first connector portion create a locking engagement with the edge structure of the aperture. In addition, the second connector portion extends through the aperture.

In yet another embodiment, a method of connecting a panel to a vehicular structure is disclosed. The method includes providing a clip that has a first connector portion and a second connector portion, placing the clip into an non-axisymmetrically-shaped aperture that is formed in the panel, twisting the clip with a screw-like motion about an axis of rotation such that a flanged locking engagement is formed between the first connector portion and the edge structure of the aperture of the panel, bringing the assembled clip and panel into contact with the vehicular structure such that the second connector portion passes through an aperture that is formed in the vehicular structure, and forming a resiliently-biased locking engagement between the second connector portion and the edge structure of the aperture of the vehicular structure such that the assembled clip, panel and vehicular structure are fixedly secured to one another.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include a fastener for joining a pair of vehicular components to one another, as well as an assembly made up of the fasteners and such pair of vehicular components. In particular, the fastener is in the form of a clip that employs a twist-lock first connector portion to engage one of the components and a resiliently-biased second connector portion to the other. Both of the clip's connector portions define a removable, serviceable configuration that not only eliminates the need to hold the aligned components in place while installing the clips through apertures that are formed in the component, but also permits the joining between the clip and the components to be undone without causing permanent damage to the parts of the assembly. Significantly, such a configuration improves the ability of an installer or other assembly-line personnel to perform a blind installation through a combination of a rotational, screwing like motion combined with a resilient snap-fit connection without having to either see that the apertures of the two components are aligned or holding the two components together prior to the introduction of the clip to the two apertures. In this way, the need for tools is obviated. Moreover, one particular configuration, the inclusion of a centrally-formed aperture within the clip allows personnel—such as the installer or a service technician—to insert a fingertip into the aperture such that by pushing against a hook that is formed at the distal end of a cantilever structure that defines the second connector portion of the clip, the personnel may temporarily overcome the resilient bias of the second connector portion as a way to unhook the clip from the second component. Likewise, by rotating the clip in a direction opposite of the installation direction, the personnel can decouple the clip from the first component.

Figure 1A:
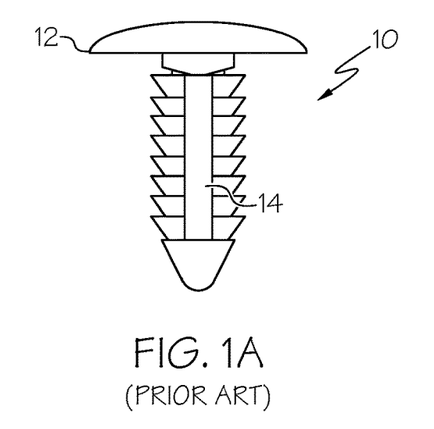
FIGS. 1A through 1C depict various clip configurations according to the prior art.
Figure 1B:
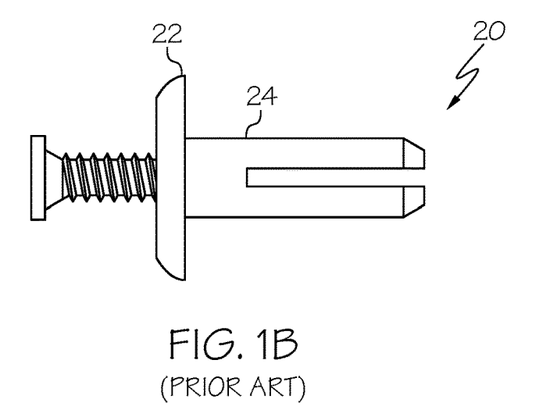
Figure 1C:
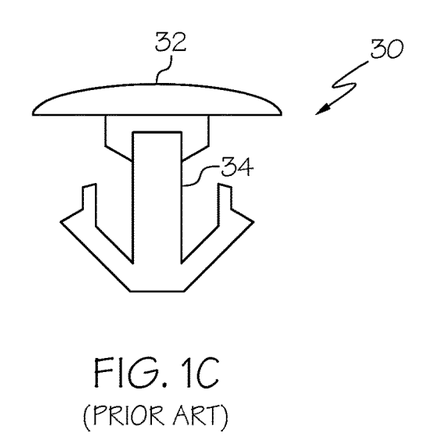

Referring first to FIGS. 1A through 1C, conventional fasteners 10, 20, 30 as known in the prior art are shown. As can be seen, all employ an enlarged head 12, 22, 32 and an axially-extending body 14, 24, 34. Fastener 10 represents one form of the so-called Christmas tree configuration in that it includes a series of axially-spaced detents on the body 14 that can engage a suitably-sized aperture (not shown) formed in a panel to be joined. The shape of the detents is such that once a locking relationship between the fastener 10 and the panel to be joined is formed, it is difficult to reverse such relationship. Likewise, fastener 20 represents a two-piece anchor bolt-type construction such that upon insertion of the body 24 into a suitably-sized aperture (not shown) formed in a panel to be joined and rotating the screw inward, the body 24 expands radially outward to form a locking relationship where its axial travel path through the aperture cannot be reversed absent reversing the direction of the screw. As will be understood, fastener 20 generally requires the use of a screwdriver or related tool to achieve its fastening function. Furthermore, fastener 30 represents a pushpin-like construction such that the radially-protruding cantilevered legs on the body 34 can be squeezed through a suitably-sized aperture (not shown) formed in a panel to be joined until they have cleared the edge defined by the aperture, at which time they snap back into their substantially original shape to form a locking relationship. As with the fastener 10, the installation of fastener 30 into the panel aperture is hard to reverse. In all cases, a blind installation would require that inserting fasteners 10, 20, 30 into a suitably-sized aperture would first require that the placing of the panel in cooperation with the vehicular structure (for example, an instrument panel) would have be done such that their respective apertures are aligned with one another while the person performing the installation or related assembly continues to hold the panel and structure together. When such operation is performed in the relatively limited confines of a vehicle passenger compartment (for example, a passenger-side footwell), the difficulty to the installer becomes manifest. Moreover, should a situation arise where the assembled components need to be subsequently decoupled from one another (such as when another component or vehicular system that is resident in or behind the instrument panel) requires servicing, the fasteners 10, 20, 30 can often only be removed through breakage of the fasteners 10, 20, 30 or damage to the surrounding panel or vehicular structure. Moreover, in situations where removal is required, specific removal tools are used, further complicating the job of the installer or service personnel.

Figure 2A:
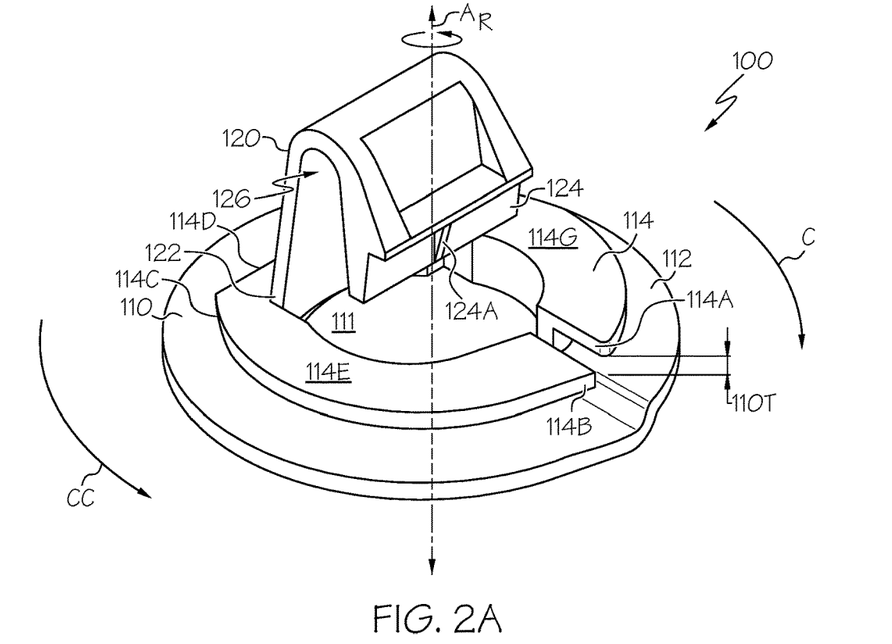
FIGS. 2A through 2C depict respectively a clip and an aperture formed in a vehicular panel that is cooperative with the clip according to one or more embodiments shown or described herein.
Figure 2B:
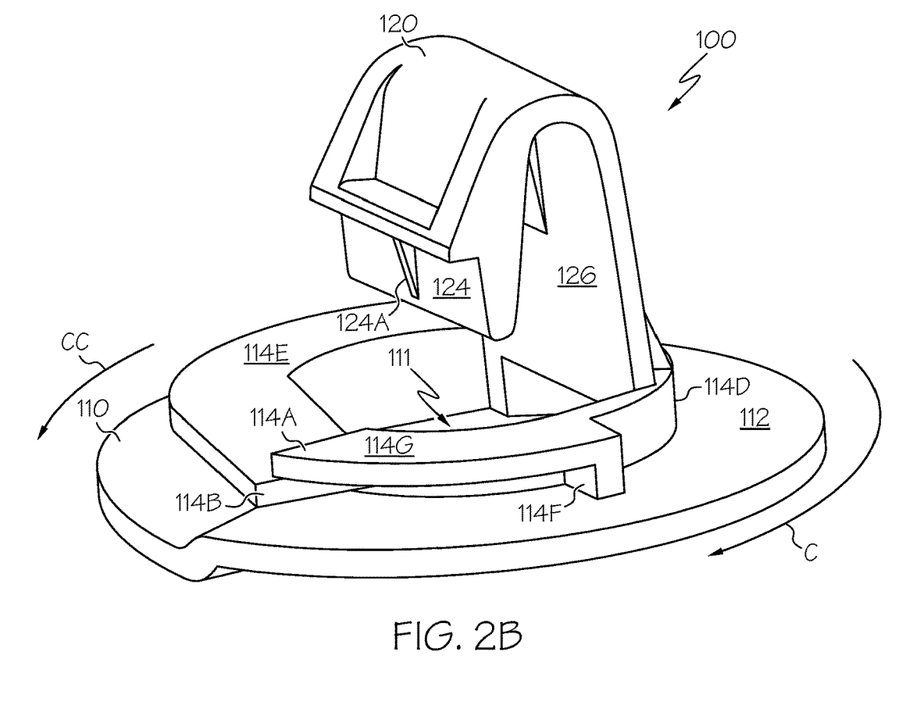
Figure 2C:
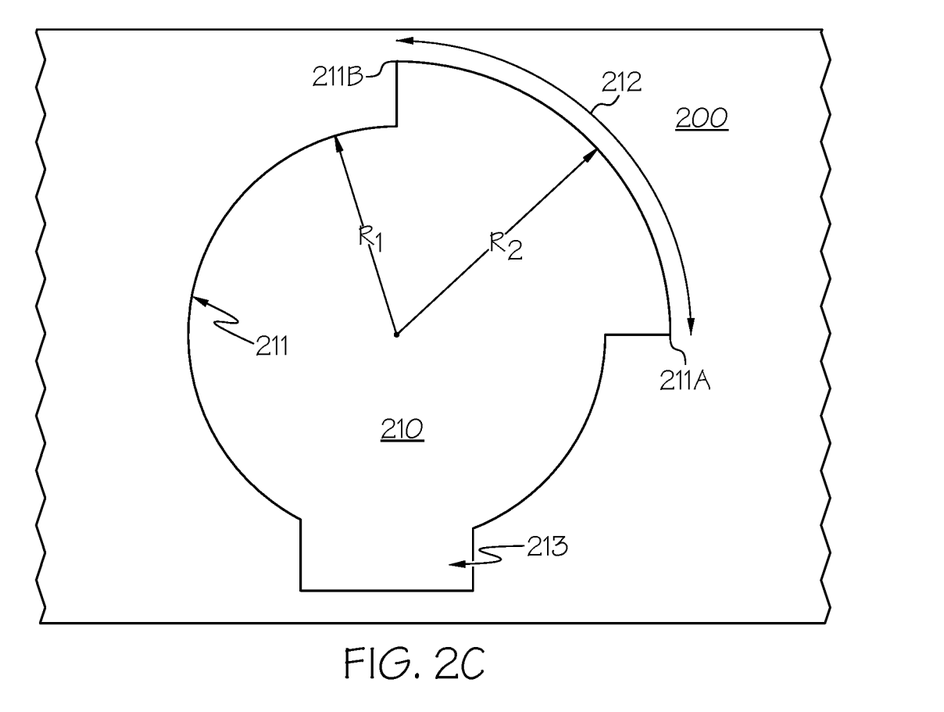

Referring next to FIGS. 2A through 2C, a fastener in the form of a clip 100 that can be used in conjunction with a first component vehicular panel 200 to attach to a second component (shown and described later) according to an embodiment of the present disclosure is shown. In particular, clip 100 of FIGS. 2A and 2B is inserted into an aperture 210 of FIG. 2C such that upon a subsequent hand-screwing or hand-twisting clockwise movement C about an axis of rotation $A_R$ of the clip 100 that extends along an insertion dimension through the aperture 210, the clip 100 can be mechanically locked to the panel 200. Clip 100 includes a first connector portion 110 and a second connector portion 120, where the axis of rotation $A_R$. First connector portion 110 is made up of a generally helical threaded structure that is bound by first and second flanges 112 and 114. In particular, the generally helical or spiral relationship between the two flanges 112 and 114, coupled with their relative difference in radially-outward projections, promotes a mechanical fit between their respective axial surfaces and an edge 211 defined by the aperture 210. As shown, of the two flanges, the first flange 112 defines a larger surface area, while the second flange 114 defines a smaller area. With the exception of a portion 114D of the flange 114 that is situated behind a connector portion 120 cantilevered structure proximal end 122, each of the flanges 112, 114 define a generally axisymmetric profile about the axis of rotation $A_R$ and are separated by a maximum axial gap thickness 110T that is either the same or slightly greater than the thickness 200T (shown in FIG. 3B) of the panel 200; by having the axial gap thickness 110T be at least as thick as the thickness 200T of the panel 200, excessive frictional forces that could make installation more cumbersome are avoided.

An aperture 111 is formed in the center of the first connector portion 110 to facilitate fingertip access to the remote or distal end of the second connector portion 120. Within the present context, discussions pertaining to the size of the aperture 111, as well as the fingertip-shaped enclosure 126 and related indicia of tool-free insertion and removal of the clip 100 are to be understood to accommodate the finger of a notional installer, assembler, service technician or related personnel that would be expected to perform vehicular component assembly and disassembly operations. By way of non-limiting example, such a dimension may define a fingertip circumference measured at the proximal end of the fingernail of between about 1.75 to 2.0 inches. By sizing the clip 100 in general and the centrally-formed aperture 111, second connector portion 120 and enclosure 126 in particular to accommodate such average fingertip dimensions, the connection of the panel 200 to—as well as the removal from—a vehicular structure is performed without the use of a screwdriver or other tool. In one non-limiting form, the substantially central aperture 111 within the first connector portion 110 has a radial dimension that is slightly smaller to that of the smaller radius of curvature $R_1$ of the aperture 210 that is formed in the panel 200 as discussed below.

Referring with particularity to FIG. 2C, the aperture 210 that is formed in the panel 200 does not define an axisymmetric structure, but instead has an irregular shape around its periphery when viewed from along the axis of rotation $A_R$. In particular, the aperture 210 exhibits the first (i.e., smaller) radius of curvature $R_1$ over a majority of the periphery and a second (i.e., larger) radius of curvature $R_2$ over a minority of the periphery. By way of example, in one embodiment, the second radius of curvature $R_2$ subtends a 90° arc or quadrant 212 of the periphery. In one non-limiting embodiment, the first radius $R_1$ may be about 13 millimeters (about 0.51 inches), while the second radius $R_2$ may be about 17 millimeters (about 0.67 inches). In addition, the non-axisymmetric nature of the aperture 210 is defined by a rectangular-shaped cutout 213; such a cutout is used for acting as a stop for a spring-like tab 114B (or, in the alternate, a finger tab; in any event defining a flexible structure that is analogous to the distal end of a diving board) that is discussed in more detail below. All told, the two different radii of curvature $R_1$ and $R_2$, along with their respective stops and discontinuities and the rectangular cutout 213 give an overall keyhole shape to the aperture 210.

Referring again with particularity to FIGS. 2A and 2B in conjunction with FIG. 2C, the radius of curvature of the first flange 112 is greater than both the first radius $R_1$ and the second radius $R_2$. Likewise, the radius of curvature of the second flange 114 is greater than the first radius $R_1$ yet smaller than the second radius $R_2$. In this way, when the clip 100 is axially inserted into the aperture 210, the quadrant 114E that extends from the end of the tab 114B to the end with the taper 114C passes all the way through the thickness of the panel 200 at its corresponding quadrant 212. In particular, the second end is structured such that it projects axially downward (i.e., away from the direction of insertion along axis of rotation $A_R$) to form a spring-like tab 114B for selective stop engagement with the rectangular cutout 213 of aperture 210, as will be discussed in more detail below. The cooperation of this and the other shaped components that make up the clip 100 and aperture 210 promotes consistent, repeatable angular orientation of the clip 100 relative to the panel 200 through a mechanically locking engagement between them. Moreover, because the connection between the clip 100 and the panel 200 is a mechanically locking one when the twist-lock or screwing motion is imparted to the clip 100, it can be undone in ways that conventional snap-fit fasteners can't. In one form, clip 100 may be made from a moldable material, such as nylon, and may be made from a unitary (i.e., one-piece) construction.

As can be seen, the second connector portion 120 has a cantilevered structure where the proximal end 122 is attached to or integrally-formed with the base-like structure of the clip 100 that is defined by the first connector portion 110. Likewise, a distal end 124 is relatively free to move in a bending or flexural motion depending on the thickness and modulus of elasticity of the second connector portion 120. This ability to flex can be used to permit a resiliently-biased engagement between a hook formed at the distal end 124 and an edge 311 of aperture 310 of a second vehicular panel (also referred to herein as a second component) 300 as will be discussed in more detail later in conjunction with FIG. 3B. A rib 124A is formed along a vertically-extending portion of distal end 124 to allow it to be more easily tuned for tension variations between the distal end 124 and the second vehicular panel 300 for either increased or decreased grip, as needed. Within the present context, while the hook of the distal end 124 of the second connector portion 120 is shown with generally J-shaped construction, it will be appreciated that other shapes are within the scope of the present disclosure so long as they form an overlapping or interference fit such as those that the resilient bias of the second connector portion 120 is designed to effect. By controlling the thickness and material choice of the clip 100 in general and the second connector portion 120 in particular, clip 100 can be tuned for ease of installation and removal. In this way, they can be made to require a much lower installation force than traditional Christmas tree clips or push-pin clips, thereby promoting improved installation ergonomics. In particular, the fatigue and related worker injury associated with the repeated installation of the conventional clips depicted in FIGS. 1A through 1C can be significantly reduced due to the lower installation force associated with clips 100. As also discussed herein, the ease with which the assemblies can be undone is also of value in that it promotes reuse and non-destructive removal of certain components in the event that service or repair of a hidden or recessed component or system is required.

In one particular form, the twist locking mechanism associated with the first connector portion 110 and its first and second flanges 112, 114 has a dual locking feature made of the vertical wall hard stop 114F between where the flanges 112 and 114 are joined for one rotational direction (i.e., the installation direction corresponding to the clockwise movement C of FIGS. 2A and 2B), and the spring-like cantilevered tab 114B which prevents rotation in the other direction. In this way, the dual locking mechanism prevents the clip 100 from rotating after mounting within the aperture 210 of the panel 200, while the threadable engagement between the first and second flanges 112, 114 and the edge 211 of the aperture 210 prevent clip 100 from falling out once it has been twisted on. As with the second connector portion 120 and its uninstalling operations, the twist locking mechanism enables a tunable, low insertion force which in turn fixes the orientation of the clip 100 relative to the panel 200 without the need for tools. This is additionally important in that it eliminates the need to install the clips 100 on the assembly line while holding the panel 200 or equivalent component in place.

More particularly, the installation (or connection) of the clip 100 can be best visualized by taking FIGS. 2A through 2C together where the surface of the panel 200 of FIG. 2C is considered to be facing in a vertically-upward direction as viewed. Initially, the installer grasps clip 100 of FIGS. 2A and 2B and introduces it from the underside of the panel 200 of FIG. 2C. At this time, the taper end 114C of quadrant 114E of the second flange 114 should be adjacent a corresponding corner portion 211A of the edge 211 of aperture 210. Once this alignment has been verified, the installer brings the clip 100 upward (i.e., through the page as shown) along the axis of rotation $A_R$. Because the second flange 114 has a smaller radial projection than the larger radius of curvature $R_2$ of the aperture 210, this quadrant 114E of second flange 114 will project upward along the vertical direction relative to the upper (i.e., visible as shown) surface of panel 200 in the region that corresponds to the panel 200 quadrant 212. Contrarily, because the first flange 112 has a larger radial projection than even the larger radius of curvature $R_2$ of the aperture 210, it will engage the opposing (i.e., vertically downward, not shown) surface of panel 200 around the entire periphery of the aperture 210.

Once this introduction of the clip 100 through the aperture 200 is accomplished, the installer then begins to twist the clip 100 with a clockwise movement C simultaneously with ensuring that the taper end 114C of quadrant 114E contacts the upper (rather than lower) surface of panel 200 such that the surface of panel 200 that is around the aperture 210 that corresponds to the smaller radius of curvature $R_1$ starts to become sandwiched between the first and second flanges 112, 114.

This clockwise movement C rotation continues until the spring-like cantilevered tab 114B starts to encounter the upper (i.e., visible as shown) surface portion of the wall around the aperture 210 at the 3 o'clock position where the corner portion 211A resides. Once this happens, the spring-like cantilevered tab 114B starts to elastically deform upwards (i.e., out of the page as shown in FIG. 2C) towards the axially-upward position of the first end 114A of the second flange 114. The clockwise movement C rotation continues until the spring-like cantilevered tab 114B encounters the rectangular cutout 213 that is shown at the 6 o'clock position of FIG. 2C.

Continued rotation of the clip 100 with the clockwise movement C then causes a vertical edge 114F that is located about 90° counterclockwise relative to the first end 114A of the second flange 114 to encounter the corner portion 211A of the edge 211 substantially simultaneously with the spring-like cantilevered tab 114B dropping into the rectangular cutout 213. At this time, the clip 100 can no longer be advanced forward along the clockwise movement C direction, and as such becomes locked in place in the aperture 210 of the panel 200. Likewise, clip 100 cannot be retracted with the counterclockwise movement CC as the vertical surface defined at the spring-like cantilevered tab 114B of the second flange 114 encounters a wall defined by the right side of the cutout 213 at the 6 o'clock position. In this way, the clip 100 is firmly secured within the aperture 210.

Figure 3A:
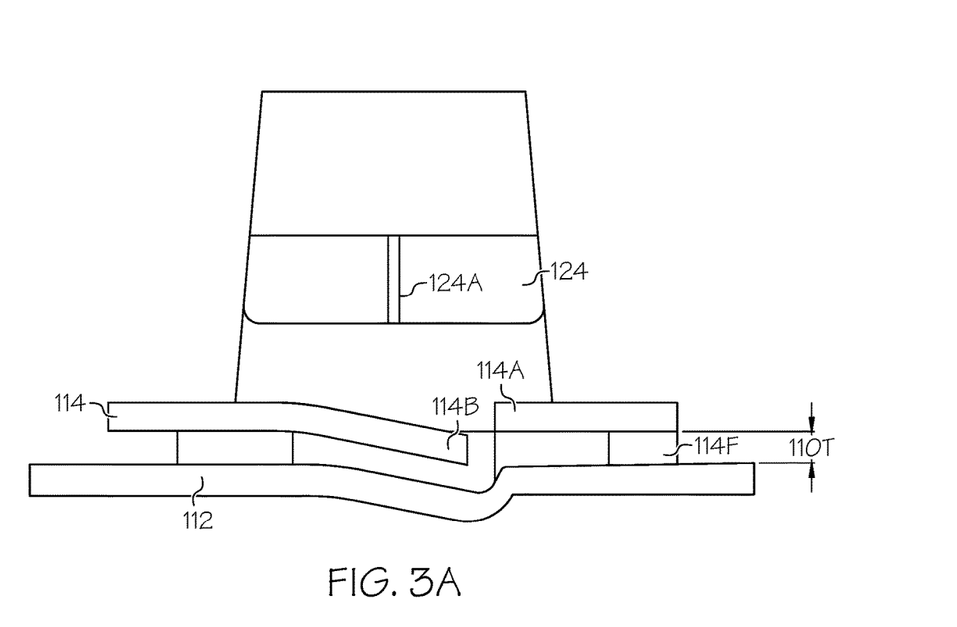
FIGS. 3A and 3B depict partial cutaway views to show the interaction of the clip of FIG. 2 with a pair of apertures that are formed through a pair of vehicular components to be attached according to one or more embodiments shown or described herein.
Figure 3B:
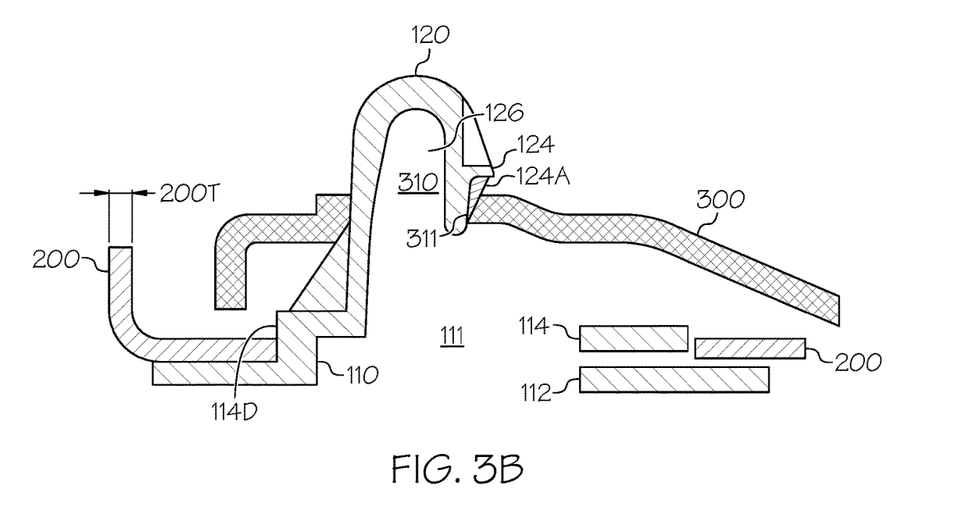

Referring next to FIGS. 3A and 3B, a cutaway elevation view of an assembly between the clip 100 and the first and second components 200, 300 is shown. In particular, FIG. 3A shows twisting cooperation between the panel 200 and the first and second flanges 112, 114, while FIG. 3B shows a different angular view of the resiliently-biased cooperation between the hook of the distal end 124 of the second connector portion 120 and the edge 311 of an aperture 310 of the second component 300 that is in one embodiment an instrument panel (as will be shown and discussed later) or related vehicle structural component. Each of the components 200, 300 define a thin, generally planar structure, at least in the region around their respective apertures 210, 310. As is shown with particularity in FIG. 3B, the thickness 200T of the panel 200 is comparable to the gap thickness 110T that was discussed above in conjunction with FIGS. 2A and 2B that helps to establish a relatively friction-free fit in response to the twist-lock connection between the panel 200 and the first connection portion 110. Likewise, as shown with particularity in FIG. 3B, the interference fit is shown between the edge 311 of the aperture 310 of the second component 300 and the hook at the distal end 124 of the second connector 120. As can be seen, the hook can define a grip at the edge 311 of the aperture 310 in a wraparound manner. In particular, the distal end 124 rests on the second component 300 under the effect of gravity. As is also seen, the aperture 111 that is defined in the first connector portion 110 also permits access to the enclosed, fingertip-shaped enclosure 126 that can be used to facilitate both the rotational/twisting movement of the clip 100 for locking or unlocking and the flexing snap-fit connection between the edge 311 of the aperture 310 and the hook at the distal end 124 of the second connector 120. Significantly, because the apertures 210 and 310 of the two components to be joined are already designed into their respective parts, and further by virtue of the fact that the clip 100 is already rigidly affixed to the panel 200 through the rotational/twist-lock fastening discussed above, placement against and subsequent connection to the second component 300 by the assembled clip 100 and panel 200 combination can be performed quickly, and without the installer having to hold the apertures 210, 310 in alignment during the assembly process. As discussed above and below in conjunction with FIG. 4, because the coupling of two separate vehicular components 200, 300 in the manner depicted in FIG. 3B is often carried out in a confined location and at an awkward body position for the installer, doing away with the need to hold both components 200, 300 together to ensure proper alignment significantly improves installation and assembly efficiency and accuracy. In particular, the precise (and repeatable) angular orientation of the numerous clips 100 on the first vehicular component 200, coupled with the relatively rigid construction of the second component 300, helps to promote a secure connection of the entire assembly. Furthermore, the use of the resiliently-biased second connector portion 120 and its snap-fit connection to the second component 300 provides notorious audible indicia of a properly-connected first and second components 200, 300. Evidence of the relatively rigid construction of the second component 300 can be seen in FIG. 3B, where the greater panel thickness relative to that of the first component helps to reduce flexing or related deformation when the second connector portion 120 is brought into interference fit with the edge 311 of aperture 310.

Removal of the clip 100 can only be done once the assembly that is made up of clip 100 and panel 200 are uninstalled from the vehicle. Thus, once the second component 300 has been connected with the second connector portion 120 and removal of the clip 100 is desired, it be achieved by depressing the distal end 124 of clip 100 to disengage the resiliently-biased second connector portion 120 from the edge 311 of aperture 300 and then pulling the clip 100 through aperture 300. The clip 100 can further be removed from the first vehicular component 200 by moving the finger-like tab 114B on the second end of the second flange 114 vertically-upward towards the remainder of the second flange 114 while simultaneously rotating the clip 100 with the counterclockwise movement CC. In this way, the edge defined at the end of the finger-like tab 114B is lifted vertically above the right-side edge wall of cutout 213. As such, once this disengagement occurs, continued counterclockwise movement CC of clip 100 until at least the substantial entirety of the quadrant 114E of flange 114 is resting on a corresponding quadrant of panel 200 that corresponds to the smaller radius of curvature $R_1$ and extends between the 3 o'clock and 6 o'clock positions thereof. This should also coincide with having the vertical wall hard stop 114F that is formed between the flanges 112 and 114 reach the 12 o'clock position of the corresponding corner portion 211B of the edge 211 of aperture 210, at which time the person performing the disassembly may slightly tilt the entire clip 100 downward at a quadrant 114G that extends between the edge formed at the first end 114A and the vertical edge 114F of the second flange 114. This slight downward tilting helps to coax the second flange 114 to move vertically downward (i.e., into the page of FIG. 2B) so that the clip falls away from the panel 200 under the force of gravity.

Figure 4:
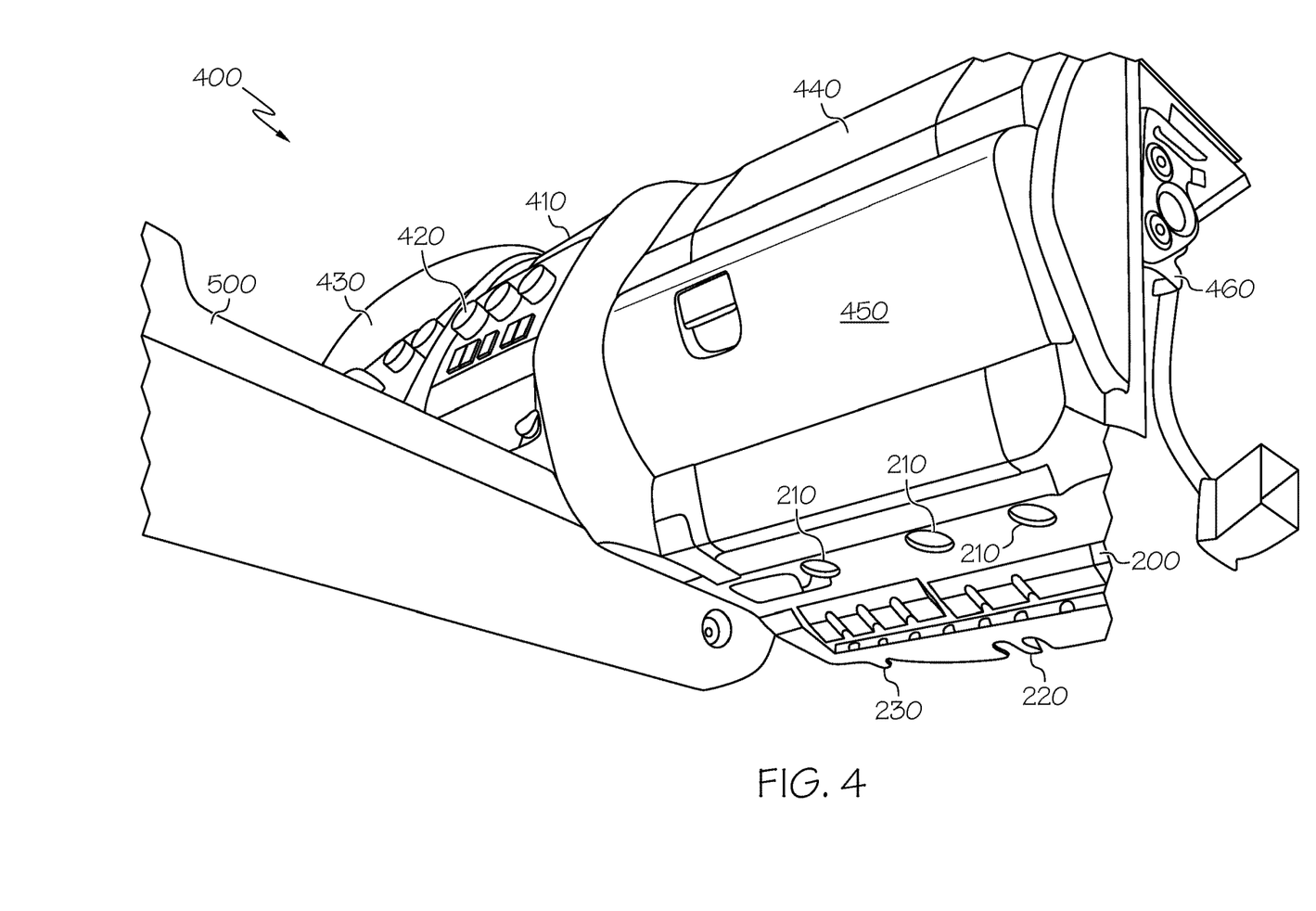
FIG. 4 depicts a lower perspective view of a vehicular instrument panel with particular emphasis on the connection of an undercover within the front passenger footwell in accordance with one or more embodiments shown or described herein.

Referring next to FIG. 4, in one particular form, the vehicular panel 200 is an undercover, while the vehicular structure to which it is attached is an instrument panel 400. Such an instrument panel 400 is made to fit within the passenger compartment of a vehicle that also includes a wheeled chassis that may either be of body-on-frame or unibody construction. As will be appreciated, the vehicle also includes a motive power unit such as a conventional internal combustion engine (ICE), battery pack, fuel cell stack or hybrid combination of one or more of the above to provide propulsive power. The passenger compartment serves not only as a place to transport passengers and cargo, but also as a place from which a driver may operate vehicle using—among other things—features on the instrument panel 400. A transmission is coupled to the motive power unit such that together they form a drivetrain through which a torque may be applied to some or all of the wheels that are rotatably coupled to the chassis.

Instrument panel 400 includes an infotainment system the information of which may be conveyed via display 410. In addition, the information panel 400 includes control switches or dials 420, cluster of gauges 430, airbag 440, glovebox 450, and conduit associated with the HVAC system 460. A guidance apparatus (which may include, among other things, steering wheel, accelerator, brakes or the like, none of which are shown) is used in cooperation with the instrument panel 400 to control movement of the vehicle. When the clip 100 of the present disclosure is used to secure covers, panels, fairings or related components to the instrument panel 400, the term "assembly" will be understood to comprise either the combination of the clip 100 to the first component (such as panel 200) or the combination of the clip 100 to the first component (such as panel 200) and that combination's connection to the second component 300 (which may be a mounting location or related structural member on or a part of instrument panel 400. As such, the use of the term "assembly" and its variants will be apparent from the context. Likewise, terms related to the affixing, connection, coupling, joining, fastening or related ways to achieve such assemblies will be understood to form a rigid, secure and semi-permanent formation of such assemblies in a manner consistent with their function within a vehicle. Thus, in a specific example, if the panel 200 forms a cover (also referred to herein as an undercover, kick panel or the like) that is used to provide physical and visual isolation between a passenger footwell and the components situated behind the instrument panel 400, the connection made possible by the clip-based assembly discussed herein is formed in such a way to maintain such isolation under normal use of the vehicle. As shown, the instrument panel 400 combines a center console 500 that is formed along a longitudinal center line of the vehicle. Together, the instrument panel 400 and center console 500 not only provide access to most of the components needed to operate the vehicle, but also provide separate seating compartments for the driver and front seat passenger. Such vehicle packaging makes for a comfortable, aesthetically-appealing front passenger compartment. Nevertheless, because the assembly of both the center console 500 to the instrument panel 400 and the instrument panel 400 to other vehicular components (such as panel 200) is performed manually, and further because at least some of these assembly operations are performed blindly by an installer who does not have visual access to the components being joined, the relatively tight confines associated with each compartment make the assembly process rather cumbersome. It will be appreciated that the vehicular panel/undercover 200 and clip 100 as discussed herein are equally effective in passenger compartment configurations that do not employ a center console 500; as such, the use of such vehicular panel 200 and clip 100 in both these and other variants of passenger compartment construction are deemed to be within the scope of the present disclosure. Through the use of the clips 100 and associated connection protocols discussed herein, at least this part of the manual assembly process can be simplified.

Figure 5:
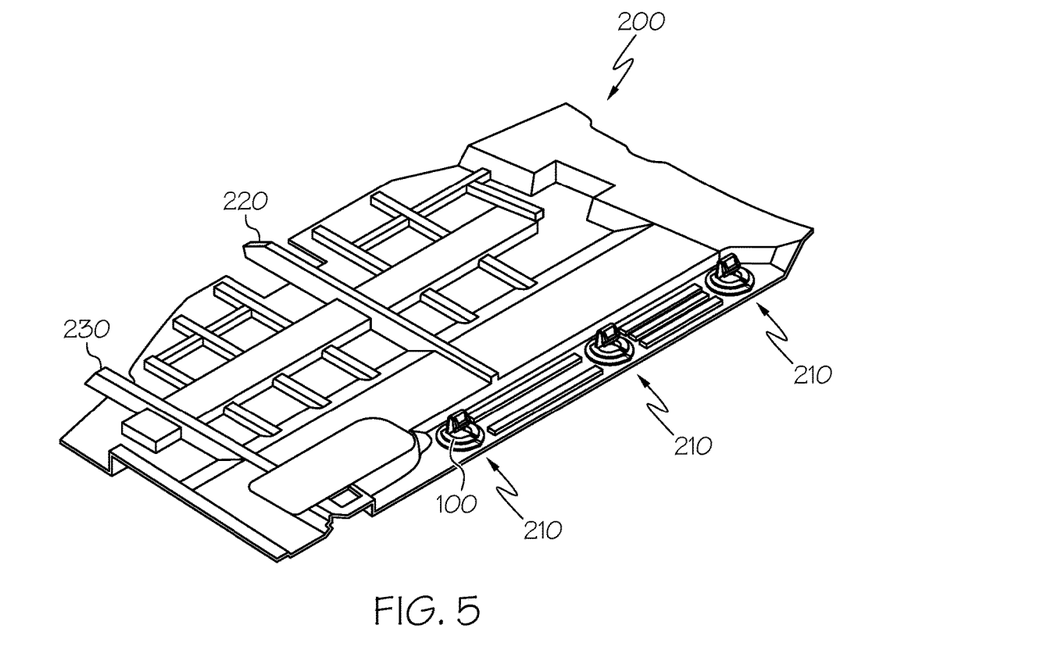
FIG. 5 depicts the undercover of FIG. 4 in isolation.
Figure 6:
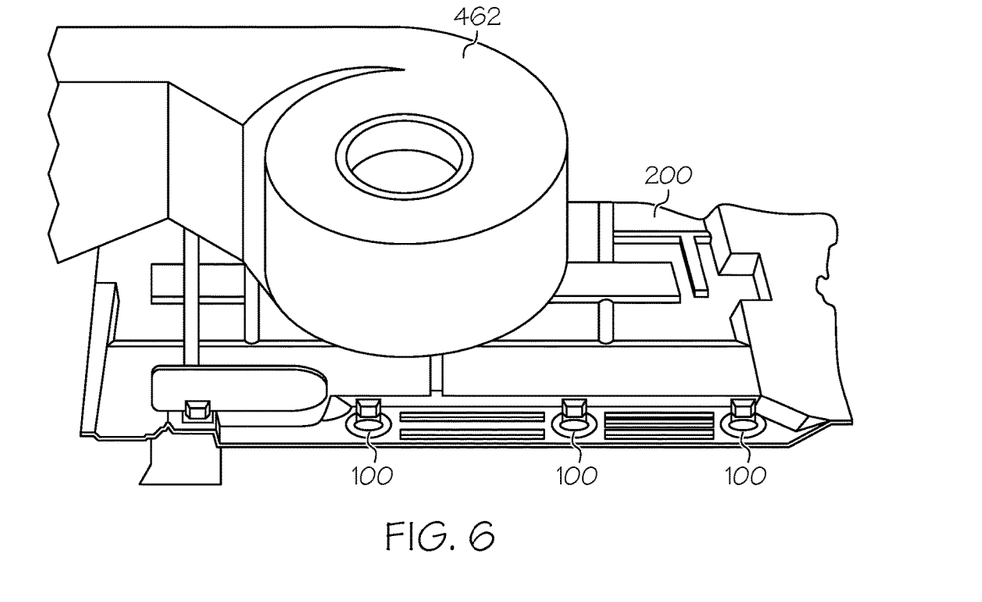
FIG. 6 depicts the undercover of FIG. 5 in relation to an HVAC blower motor that is mounted within the instrument panel of FIG. 4, along with a partial attachment of the undercover to the instrument panel of FIG. 4 in accordance with one or more embodiments shown or described herein.

Referring next to FIGS. 5 and 6, the screw-like insertion of the baselike first connector portion 110 of the clip 100 allows for easy pre-installation and removal of the clip 100. This is a significant improvement over conventional Christmas tree or push pin style clips because it allows for the clip to be installed on the substrate prior to installation of the substrate onto the vehicle. This in turn makes assembly of the substrate much easier and faster, especially in a blind installation. As shown with particularity in FIG. 6, panel 200 protects the HVAC blower motor 462 and other (such as power lines, wiring harnesses or the like, none of which are shown) that is mounted behind the instrument panel 400 from the passenger's feet, as well as protects the passenger's feet from these same components. It will be appreciated that although panel 200 is shown as the first component to be joined, the clip 100 and its portion of the assembly could also be used to connect trim, garnish, fascia or other relatively non-loadbearing vehicular components that are used in other parts of the vehicle. Another exemplary could include installation of a package tray or trunk liner, even though the installation of such components might not involve blind operations. In circumstances such as this, even though the same ergonomic benefits might not be realized, the accurate and repeatable placement of the clip 100 relative to the corresponding first component still provides improvements in that manufacturing or assembly tolerances are reduced. FIG. 5 moreover shows that relatively rigid, accurately-placed inserts (such as tabs 220, 230) that are configured to engage the front (i.e., firewall) side of the panel 200 are inserted into respective mating holes (not shown) within the instrument panel 400, after which the clips 100 are snap-fit into place in the aligned apertures (not shown, but represented elsewhere in this disclosure by apertures 310) that are formed on the underside of the instrument panel 400.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular assembly comprising:
a first component defining an aperture therein;
a second component defining an aperture therein, the first and second components sized and shaped such that upon being joined to one another, their respective apertures are substantially aligned with one another; and
a clip cooperatively engaged with the substantially aligned apertures and comprising a first connector portion and a second connector portion, the clip defining an axis of rotation about an aperture-insertion dimension thereof such that upon insertion of the clip into the aperture of the first component and subsequent rotation about the axis of rotation, the first connector portion forms a locking engagement with an edge structure that is defined by the aperture of the first component and further upon insertion of the clip into the aperture of the second component, the second connector portion of the clip forms a resiliently-biased engagement with an edge structure that is defined by the aperture of the second component.

2. The assembly of claim 1, wherein the locking engagement comprises a flanged locking engagement.

3. The assembly of claim 1, wherein the resiliently-biased engagement comprises a cantilever structure along the axis of rotation such that one end of the cantilever structure is secured to the first connector portion while the other end of the cantilever structure defines a hook.

4. The assembly of claim 1, wherein the locking engagement comprises a flanged locking engagement and the resiliently-biased engagement comprises a cantilever structure along the axis of rotation such that one end of the cantilever structure is secured to the first connector portion while the other end of the cantilever structure defines a hook.

5. The assembly of claim 4, wherein the aperture of the first component defines a non-axisymmetric shape about the axis of rotation of the clip.

6. The assembly of claim 5, wherein the non-axisymmetric shape comprises at least two different radii of curvature defined over respective portions of the periphery of the aperture of the first component such that upon placement of the clip along its aperture-insertion dimension through the aperture of the first component and rotation about the axis of rotation to form the flanged locking engagement between the edge structure of the aperture of the first component and a pair of flanges formed on the clip along its insertion dimension.

7. The assembly of claim 6, wherein the edge structure of the aperture of the second component defines the resiliently-biased engagement with the hook.

8. The assembly of claim 1, wherein the clip further defines a substantially central aperture within the first connector portion.

9. The assembly of claim 1, wherein the first component comprises a cover and the second component comprises an instrument panel.

* * * * *